United States Patent
Guigues et al.

(10) Patent No.: US 9,189,855 B2
(45) Date of Patent: Nov. 17, 2015

(54) THREE DIMENSIONAL CLOSE INTERACTIONS

(71) Applicant: Softkinetic Software, Brussels (BE)

(72) Inventors: Laurent Guigues, Brussels (BE); Olivier Feys, Brussels (BE); Kevin Simons, Brussels (BE); Yunshu Hou, Brussels (BE); Aliaksandr Kamovich, Brussels (BE)

(73) Assignee: Softkinetic Software, Brussels (BE)

( * ) Notice: Subject to any disclaimer, the term of this patent is extended or adjusted under 35 U.S.C. 154(b) by 0 days.

(21) Appl. No.: 14/366,640

(22) PCT Filed: Jun. 6, 2013

(86) PCT No.: PCT/EP2013/061711
§ 371 (c)(1),
(2) Date: Jun. 18, 2014

(87) PCT Pub. No.: WO2014/001058
PCT Pub. Date: Jan. 3, 2014

(65) Prior Publication Data
US 2015/0117708 A1    Apr. 30, 2015

(30) Foreign Application Priority Data
Jun. 25, 2012  (EP) .................................. 12173489

(51) Int. Cl.
*G06K 9/00* (2006.01)
*G06T 7/00* (2006.01)
*G06T 7/20* (2006.01)

(52) U.S. Cl.
CPC .............. *G06T 7/0042* (2013.01); *G06T 7/2033* (2013.01); *G06T 2207/10028* (2013.01); *G06T 2207/30196* (2013.01)

(58) Field of Classification Search
USPC .................................. 382/103, 173, 190, 195
See application file for complete search history.

(56) References Cited

U.S. PATENT DOCUMENTS 8,639,020 B1 * 1/2014 Kutliroff et al. ............... 382/154
2003/0156756 A1 * 8/2003 Gokturk et al. ............... 382/190
(Continued)

FOREIGN PATENT DOCUMENTS

JP    2004-94288 A    3/2004
JP    2011-65652 A    3/2011
(Continued)

OTHER PUBLICATIONS

Argyros et al.; Real-Time Tracking of Multiple Skin-Colored Objects with a Possibly Moving Camera; article; Proceedings of the European Conference on Computer Vision (ECCV 2004); pp. 368-379, vol. 3; Springer-Verlag Berlin Heidelberg; Prague, Czech Republic.
(Continued)

*Primary Examiner* — John Strege
(74) *Attorney, Agent, or Firm* — Reinhart Boerner Van Deuren P.C.

(57) ABSTRACT

Described herein is a method for detecting, identifying and tracking hand, hand parts, and fingers on the hand (500) of a user within depth images of a three-dimensional scene. Arms of a user are detected, identified, segmented from the background of the depth images, and tracked with respect to time. Hands of the user are identified and tracked and the location and orientation of its parts, including the palm and the fingers (510, 520, 530, 540, 550) are determined and tracked in order to produce output information enabling gesture interactions.

18 Claims, 7 Drawing Sheets

(56) References Cited

U.S. PATENT DOCUMENTS

| | | | |
|---|---|---|---|
| 2004/0101192 A1 | 5/2004 | Yokoyama | |
| 2005/0031166 A1* | 2/2005 | Fujimura et al. | 382/103 |
| 2005/0271279 A1 | 12/2005 | Fujimura et al. | |
| 2009/0110292 A1* | 4/2009 | Fujimura et al. | 382/203 |
| 2012/0099765 A1* | 4/2012 | Zheng | 382/103 |
| 2012/0134536 A1 | 5/2012 | Myokan | |

FOREIGN PATENT DOCUMENTS

| | | |
|---|---|---|
| JP | 2012-113622 A | 6/2012 |
| WO | WO 03/071410 A2 | 8/2003 |

OTHER PUBLICATIONS

S.E. Ghobadi et al.; Hand Segmentation Using 2D/3D Images; article; Proceedings of Image and Vision Computing New Zealand 2007, pp. 64-69, Hamilton, New Zealand, Dec. 2007.

I. Oikonomidis et al.; Tracking the Articulated Motion of Two-Strongly Interacting Hands; http://www.ics.forth.gr/'argyros/mypapers/2012_06_cvpr_twohands.pdf; 8 pages; known to Applicant prior to filing of priority application.

M.K. Bhuyan et al.; Fingertip Detection for Hand Post Recognition; International Journal on Computer Science and Engineering (ISCSE); vol. 4, No. 03, Mar. 2012; pp. 501-511.

Yaroslav Bulatov et al.; Hand recognition using geometric classifiers; http://www.ams.sunysb.edu/~saurabh/research/hand_workshop.pdf; 3 pages; known to Applicant prior to filing of priority application.

Thiago R. Trigo et al.; An Analysis of Features for Hand-Guesture Classification; IWSSIP 2010—17th International conference on Systems, Signals and Image Processing; Electronic Engineering and Computer Department; Aeronautics Technological Institute (ITA), Sao Jose dos Campos, Brazil; pp. 412-415.

Andrew Kirillov; Hand Gesture Recognition; internet publication; www.codeproject.com/articles/26280/hands-gesture-recognition?display=print; 16 pages printed; May 2008.

Laurent Guigues; Comparison of Image Segmentations Using a Hierarchical Model for N To M Regions Matchings; Institut Géographique National / MATIS, Saint-Mandé Cedex, France; publication; pp. 41-50; Proc. of 2nd IAPR-TC15 Workshop on Graph-Based Representations, Haindorf, Austria; 1999; known to Applicant prior to filing of priority application.

S. Malassiotis et al.; Real-Time hand posture recognition using range data ; publication; ScienceDirect, Image and Vision Computing 26 (2008) 1027-1037; Elsevier; 11 pages; Nov. 12, 2007.

Georg Hackenberg et al.; Lightweight Palm and Finger Tracking for Real-Time 3D Gesture Control; publication; IEEE Vurtual Reality 2011; 8 pages; Mar. 19-23, 2011 ; Singapore.

* cited by examiner

THREE DIMENSIONAL CLOSE INTERACTIONS

FIELD OF THE INVENTION

The present invention relates to improvements in or relating to three dimensional (3D) close interactions, and is more particularly, although not exclusively, concerned with detection and tracking of the hand(s) and/or main parts of a hand of a user at distances close to a depth sensing imaging device so that information enabling hand and/or finger based gesture interactions to be determined.

BACKGROUND TO THE INVENTION

Human to computer interactive systems and methods using gesture and movement recognition are technologies known from the computer vision domain. The recent range finding camera device based interactive systems, for example, a system using a 3D structured light camera, are also known to enable 3D gesture and movement recognition of users when performed in the field of view of the particular imaging device. In such systems, a human user is typically standing at least at 1 m from the camera and his movements and/or gestures need to be bold, that is, large enough to be detected by the 3D camera, the resolution of which is predefined and limited. For example, a typical 3D camera resolution is in accordance with quarter video graphics array (QVGA), that is, 320*240 pixels, and, therefore limits the accuracy of detectable movement or the capacity of detecting small objects, such as fingers, when they are situated far too away from the 3D imaging device. In such systems, it is generally not possible to detect and track reliably the hands of a user, and more particularly, the fingers of the hand at such distances. More precisely, most of the current 3D imaging devices are built to enable full skeletal tracking of a user in the range of between 1 m and 5 m from the camera. Moreover, most of these 3D imaging devices have technical specifications which do not allow them to perform measurements in the range from between 0 m and 1.5 m from the camera sensor.

However, with the development of some new technologies, among which is the 3D time-of-flight (ToF) cameras, it becomes possible to detect and to track features at different distances from the camera sensor, including features, such as the hands and/or fingers of a user, at distances less than 1 m, typically less than 0.5 m, form the camera sensor. This is termed "close interaction", and this is particularly adapted for enabling touch-less hand and finger gesture based interactions in a desktop environment or in other environments, such as in an automotive environment.

It is known to detect the presence of a plurality of parts of a human being within an image embedding colour channels for each pixel using detection of skin colour. Such a method is described in an article entitled "Real Time Tracking of Multiple Skin Colored Objects with a Possibly Moving Camera" by A. A. Argyros & M. I. A. Lourakis, in Proceedings of the European Conference on Computer Vision (ECCV '04), Springer-Verlag, vol. 3, pages 368 to 379, May 11 to 14, 2004, Prague, Czech Republic. Here, blobs are detected based on a Bayesian classifier which is bootstrapped with a small training set of data, and, includes skin-colour probabilities to enable the classifier to cope with illumination changes as colour measurements may be disturbed by environmental illumination. This detection method basically enables the detection of hands and face of a user in a close interaction environment, and may when be combined with some tracking capabilities of these detected skin-colour blobs so that information about the position of the blobs in the image can be provided. Such information can then be used to provide input to gesture recognition systems, for example, to control in a simple way, the mouse of a computer without physical contact.

In another disclosure, a fast and robust segmentation technique based on the fusion of 2D/3D images for gesture recognition is described by S. E. Ghobadi, O. E. Loepprich, K. Hartmann, & O. Loffeld in an article entitled "Hand Segmentation using 2D/3D Images", Proceedings of Image and Vision Computing New Zealand 2007, pages 64 to 69, Hamilton, New Zealand, December 2007. A 3D ToF camera is used for generating an intensity image together with range information for each pixel of a Photonic Mixer Device (PMD) sensor. The intensity and range data are fused to provide input information to a segmentation algorithm relying on the K-Means mixed with expectation maximisation technique (KEM). The KEM combines K-Means clustering techniques with expectation maximisation technique so that centres of natural clusters are located in an initial step using the K-means, and, in a second step, soft probabilistic assignments of expectation maximisation are used to find local maxima iteratively and thus refine position and borders of the found clusters. In a simple environment in which the background is uniform and at a sufficient distance from the objects to be segmented, the fused data enables a proper segmentation in real time of the hand of a user from his/her body, face, arm or other objects in the scene whatever the illumination conditions. Robustness of the method in the environment being considered is said to satisfy a use as the first step of processing technique in 2D/3D gesture tracking and gesture recognition. In another article entitled "Tracking the Articulated Motion of Two Strongly interacting Hands" by I. Oikonomidis, N. Kyriazis & A. A. Argyros, (http://www.ics.forth.gr/~argyros/mypapers/2012 06 cvpr twohands.pdf), particle swarm optimisation (PSO) is used to process signals from a RGB-D sensor, that is, a colour sensor that also provides depth information. The method performs marker-less visual observations to track the full articulation of two hands interacting with one another in a complex, unconstrained manner. The method described achieves complete detection and tracking of two interacting hands by directly attributing sensory information to the joint articulation of two synthetic and symmetric 3D hand models of known size and kinematics. For given articulations of the two hands, a prediction of what the RGB-D sensor would perceive is obtained by simulating the image acquisition process, for example, by producing synthetic depth maps for the specific camera-scene calibrations. Having established a parametric process that produces comparable data to the actual input, tracking is performed by searching for the parameters that produce depth maps which are most similar to the actual input. Tracking is performed in an online fashion, where, at each step and for every new input, an optimisation step is performed, and using a variant of PSO, the discrepancy between the actual RGB-D input and simulated depth maps generated from hypothesised articulations is minimised, the best scoring hypothesis constituting the solution for the current input. The discrepancy measure is carefully formulated so that robustness is achieved with computational efficiency and temporal continuity being utilised at each optimisation step.

Forearm and hand segmentation is also described in "Fingertip Detection for Hand Pose Recognition" by M. K. Bhuyan et al., International Journal on Computer Science and Engineering (ISCSE), Vol. 4, No. 3, March 2012. Here, a method for fingertip detection and finger type recognition is proposed in which fingertips are located in the hand region using Bayesian rule based skin colour segmentation. Morphological operations are then performed in the segmented hand region by observing some key geometric features. A final probabilistic modeling of the geometric features of finger movements is then performed so that a finger type recognition process is significantly made more robust, especially in the context of providing valuable information for finger spelling in sign language recognition and gesture animation.

In an article entitled "Real-time hand posture recognition using range data" by S. Malassiotis & M. G. Strintzis, Image and Vision Computing, 26 (2008), pages 1027 to 1037, a method is described in which arm segmentation, hand-forearm segmentation, hand pose estimation and gesture classification are performed in order to recognise complex hand postures such as those encountered in sign language alphabets. Three-dimensional image data is captured and processed in accordance with the method by utilising three-dimensional hand geometry to recognise sign language postures and/or gestures.

WO-A-03/071410 describes another method for enabling a person to interact with an electronic device using gestures and poses. The method includes obtaining position information for a plurality of discrete regions of a body part of the person. The position information includes depth values of each discrete region of the body part relative to a reference position. A depth image of a 3D scene is captured using a 3D sensor system and processed to segment one or more regions of interest from the background of the scene, each region of interest including a hand whose gestures are to be detected. Each gesture is classified and compared to a set of different hand gestures.

Despite hand detection and modelling being widely addressed in the literature, none of the documents described above provides for the detection and tracking of the parts of the hands and their parameters including fingers, palm and orientation, at distances close to the imaging device using a depth map from a 3D imaging sensor as input information, and without the use of any colour information, nor the use of any hand model or skeletal representation having articulations.

SUMMARY OF THE INVENTION

It is therefore an object of the present invention to provide a method for the detection, localisation and segmentation of hands of a user, and in particular, fingers, finger tips, palm and parameters of the hand, in a predetermined volume defined by the frustum of a 3D sensing device, such as, a time-of-flight (ToF) camera having adequate resolution.

It is another object of the present invention to provide a method for the detection, localisation and segmentation of hands of a user, and in particular, fingers, finger tips, palm and parameters of the hand, without using any model or skeletal representation to be fitted or matched onto an input depth map.

It is another object of the present invention to provide a method for the detection, localisation and segmentation of hands of a user, and in particular, fingers, fingertips, palm and parameters of the hand, irrespective of the pose in space of the hand.

It is further object of the present invention to provide a method for the detection, localisation, and segmentation of a plurality of hands of at least one user standing in a scene, and using input information provided by a 3D sensing device having near mode detection capability.

It is another further object of the present invention to provide input data to a human-to-machine interface which utilises hand and finger gestures and/or poses for close interaction using a 3D sensing device.

It is a further object of the present invention to provide control of a computerised system using only the hands operating within a frustum of a 3D sensing system associated with the computerised system.

In accordance with a first aspect of the present invention, there is provided a method of detecting and tracking at least one feature associated with an extremity of a user in a three-dimensional scene using depth images of the scene, the method comprising the steps of:

a) segmenting at least one region of interest within each depth image;

b) determining at least one object of interest that corresponds to a limb of the user within the segmented depth image;

c) tracking each limb with respect to time;

d) identifying an extremity associated with each limb;

e) tracking each identified extremity with respect to time;

f) isolating each identified extremity from its associated limb;

g) determining parameters relating to each isolated extremity;

h) identifying at least one feature in each isolated extremity; and e) tracking each identified feature with respect to time.

Step a) may comprise utilising at least one structuring element adapted to be a function of the depth of each pixel in the depth image.

Step c) may comprise determining temporal associations for each limb. In this case, step e) comprises tracking each extremity based on temporal associations assessed for each limb.

In one embodiment, step d) may further comprise using a weighted average of points of each limb in the depth image to identify each extremity.

In another embodiment, step f) may comprise the steps of:

f1) determining a centre of each extremity associated with each limb of the user; and f2) determining a distance from the centre of the extremity to its boundary.

Additionally, step f) may further comprise using a cutting process to isolate the extremity from the limb, the cutting process being centred on the determined centre of the extremity.

Alternatively or additionally, step d) may further comprise using a growing process to isolate the extremity from the limb.

Step g) may comprise the step of determining at least one parameter associated with the extremity. Each such determined parameter associated with the extremity may be used to identify at least one feature associated with the extremity. In one embodiment, the at least one parameter associated with the extremity may comprise the orientation of the extremity within the depth image.

In one embodiment, step g) may further comprise using each determined parameter to determine a tip position of the extremity.

In one embodiment, the limb comprises an arm and the extremity comprises a hand, and wherein each feature associated with the extremity comprises at least one finger of the hand. In this case, step h) comprises identifying silhouette fingers and pointing fingers within a hand contour. In another embodiment, step h) comprises identifying each finger tip.

This may be achieved by merging the identified silhouette fingers and pointing fingers to form a unique set of fingers.

In accordance with another aspect of the present invention, there is provided a gesture recognition method for recognising gestures made by at least one hand, comprising the method of detecting and tracking at least one feature associated with an extremity of a user in a three-dimensional scene using depth images of the scene as described above.

In accordance with a further aspect of the present invention, there is provided a computer program for performing the steps of the method of detecting and tracking at least one feature associated with an extremity of a user in a three-dimensional scene using depth images of the scene as described above.

BRIEF DESCRIPTION OF THE DRAWINGS

For a better understanding of the present invention, reference will now be made, by way of example only, to the accompanying drawings in which.

DESCRIPTION OF THE INVENTION

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

It will be understood that the terms "vertical" and "horizontal" are used herein refer to particular orientations of the Figures and these terms are not limitations to the specific embodiments described herein.

The present invention is directed to detecting and tracking at least one part of at least one hand of at least one user within a scene for enabling human to computer interactions in a close interaction context. The detection and tracking aims at determining the respective position of the hand or the part of the hand which will perform interactions with respect to time so that to be able to detect and recognise, in a further step, static poses and dynamic gestures made by this hand or part of this hand and, in particular, those made by the fingers of this hand. By using depth-related information, a plurality of objects of interest in the scene are determined and segmented over different captured images. The depth-related information is obtained using a ToF camera having close interaction capability, that is, having a range below 1 m and preferably below 0.5 m. The method would be suitable for use in a context in which the user stands far away from the camera or imaging device, that is, at more than 1 m from the camera, if the camera or imaging device comprises a sensor having a resolution compliant for finger detection and tracking at that distance.

The term "pose" as used herein refers to an arrangement of a set of key points representing the hand at a particular instant in time. The term "gesture" as used herein refers to a change in the arrangement of the key points of the hand with respect to time, in addition or alternatively, the term "gesture" may also refer to a change in the position of an unchanged arrangement of the key points in space with respect to time.

If the pose does not change with respect to time, that is, the arrangement of key points and its position within space remains unchanged, it is described as a static pose. If the arrangement of key points remains unchanged and the position of the arrangement changes within space with respect to time, this can be described as a gesture having static pose. If the arrangement of key points changes with respect to time, this is described as a gesture having different poses.

In accordance with the present invention, a method is described which provides for the detection, tracking, and modelling of the hands of a user, including in particular the fingers and the palm, based on a real-time stream of depth images acquired by a 3D sensing device. In particular, a ToF 3D camera may be used to provide the depth images in the form of 3D point clouds or depth maps. In addition, the method of the present invention can be used to detect, track and model more than one hand and utilises a smart segmentation method for isolating object of interest in the scene, namely the hands in a preferred embodiment of the present invention. However, the method is not limited to hands and can be used for tracking other extremities or potentially interacting objects the form of which is known.

Figure 1:
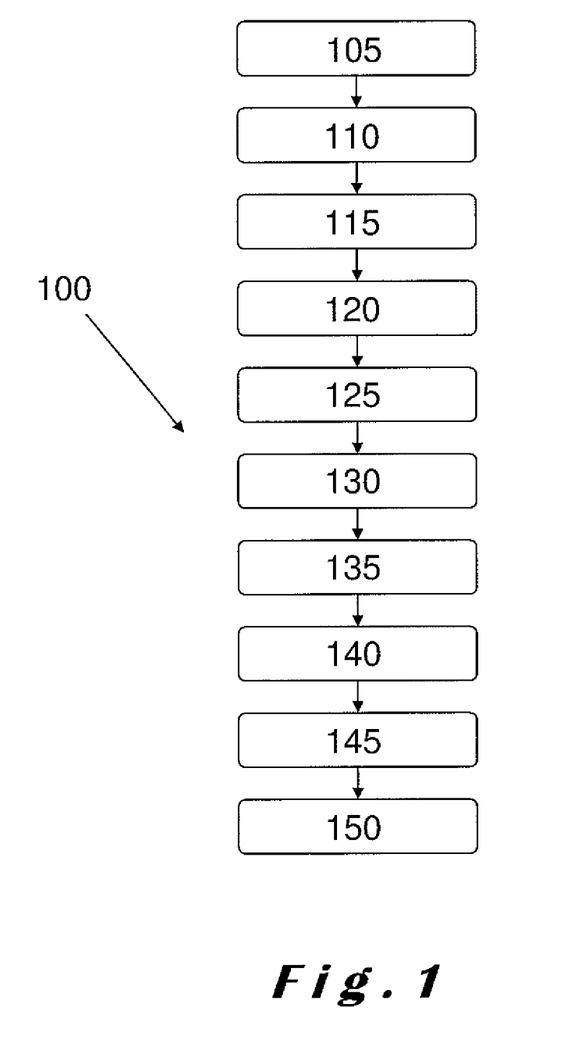
FIG. 1 illustrates a flow chart illustrating the steps of the method in accordance with the present invention.

FIG. 1 illustrates a flow chart 100 illustrating the steps in the method of the present invention. The first step, step 105, is to acquire a depth image which may be in the form of a 3D point cloud or of a depth map as described above. The next step is to segment limbs of a user from the rest of the depth image, step 110. The segmented limbs are tracked, step 115, and then the extremities of the tracked limbs are determined, step 120. These limb extremities are then tracked, step 125, and modelling of those extremities is performed, step 130. After the modelling, a recognition process for recognising the hands is performed, step 135, and then the geometrical modelling of the hands is performed, step 140. The fingers of the hands are then detected and tracked, step 145, and a further computation of the openness of the hands may be determined, step 150. The output from step 150 can be used, for example, for controlling an interaction with a computerised system which includes a 3D imaging system for the capture of the input 3D point cloud or depth map. Each of the steps of the process will now be described in more detail below.

The depth image, step 105, may be acquired by any suitable known technique, for example, using a 3D imaging system or other range finding measurement camera or imaging device which, either provides the depth image directly, or provides the depth image in the form of a 3D point cloud in a determined coordinate system. The depth image forms an input to the limbs segmentation process in step 110.

The 3D imaging system comprises a camera or imaging sensor having known physical parameters, for example, focal length, field of view, lens distortion etc. From this, 2D points corresponding to an object within the frustum of the imaging system in captured image together with their depth values can easily be transformed into 3D coordinates in a camera reference system. This means that real world coordinates at a given position in space can be transformed into coordinates into image space, for example, pixel units in a depth map. A radius of the erosion/dilation sphere used in the morphological opening process described in more detail below provided in the real world metric system is transformed to a radius in the depth image for each pixel independently, knowing its depth.

In the limbs segmentation process, step 110, the depth image forms the input and particular regions of the current depth image are delineated which correspond to objects having smaller dimensions than a predefined or threshold value in 3D space. The maximum dimension value is set to be greater than the width of the limbs and the head of a human being, but less than the width of the chest of a human being. This enables the regions to be delineated by the limbs segmentation process to include limbs and head of humans visible in the image, but not the torso nor the background.

The limb segmentation step may be performed using a particular adaptation of a fundamental image filtering algorithm, for example, a morphological opening process, followed by a region growing and merging method specially adapted for the implementation of the present invention which require the use of depth map information. The morphological opening process on a real valued image comprises calculating the erosion of the image using a structuring element of predefined size which results in an 'eroded image'; and calculating the dilation of the eroded image with another structuring element.

Erosion is one of two fundamental operations in morphological image processing from which all other morphological operations are based. The basic idea in binary morphology is to probe an image with a simple, predefined shape, and to determine how this predefined shape fits or does not fit the shapes in the image being processed. This simple "probe" is called a structuring element, and is itself a binary image, that is, a subset of the space or grid or pixels.

The other of the fundamental operations in morphological image processing is dilation. Here, the basic effect of the operator on a binary image is to gradually enlarge the boundaries of regions of foreground pixels, for example, typically white pixels in a 2D image, or pixels closer than a predetermined distance in a depth map, so that areas of foreground pixels grow in size while holes within those regions become smaller. The dilation operator takes two pieces of data as inputs, namely, the image to be dilated, and a set of coordinate points, normally a small set, known as a structuring element (also known as a kernel). It is this structuring element that determines the precise effect of the dilation on the input image.

The use of a morphological opening process has two advantages, namely, that two different structuring elements may be used for erosion and dilation steps, and that the size of the structuring elements may be adapted for each pixel in the image according to the depth value it contains instead of using a fixed size for the whole image like in standard 2D image processing techniques. In a particular and advantageous embodiment, the size of the structuring element, for example, a sphere having a radius r, is adapted to be a function of the depth of each pixel, that is, the distance of the pixel from the camera or 3D imaging system, so that if the element was positioned at a real world 3D position of the point corresponding to the camera coordinate system, then it would have a constant size. This provides a 'perspective invariant' opening. This means that changes in perspective of the object do not affect the size of the opening.

As part of the limbs segmentation step, step 110, parameters, such as, erosion radius in meters, $r_e$, and dilation radius in meters, $r_d$, may be determined as part of the morphological opening process. In addition, parameters, such as, a difference threshold, t, and a maximum change in depth, $\Delta d$, are applied to the input depth image as part of the limbs segmentation step. Although these parameters are derived in the limbs segmentation step, they are not used in subsequent processing steps.

The output from the limb segmentation step, step 110, comprises a label image which is derived from an erosion image (erosion), an opening image (dilation), an output difference image (difference), and an output region label image (labelling of connected regions).

For each pixel of the image having a depth, d, the erosion image is determined from a sphere by projecting, in image space, a sphere of radius $r_e$ centred on the 3D point corresponding to the pixel; and the maximum depth value of the image on this disk is calculated and assigned to the corresponding pixel of the eroded image.

For each pixel of the eroded image, the output opening image is determined from a disk obtained by projecting, in image space, a sphere of radius $r_d$ centred on the 3D point corresponding to the pixel; and the maximum value of the eroded image on this disk is calculated and assigned to the corresponding pixel of the opened image.

For each pixel of the depth image, the output difference image is determined as the difference between its depth and its value in the opening image. A pixel is considered as belonging to a 'limb' if its output difference is greater than the difference threshold, t.

The output region label image (connected regions labelling) is determined by marking each pair of neighboring pixels of the image as being connected if their absolute difference of depth value is smaller than the maximum change in depth, $\Delta d$; and labelling each connected component differently in accordance with the 'connected' relationship determined previously.

Small regions are then merged into larger adjacent regions in order to remove spurious small regions from the 'limb' segmentation determination. A connectivity based segmentation of the remaining unlabelled zones of the region label image allows one to isolate 'bodies'. An analysis of the connectivity between adjacent limbs and bodies then allows an assessment as to which limb is connected to which body.

Figure 2:
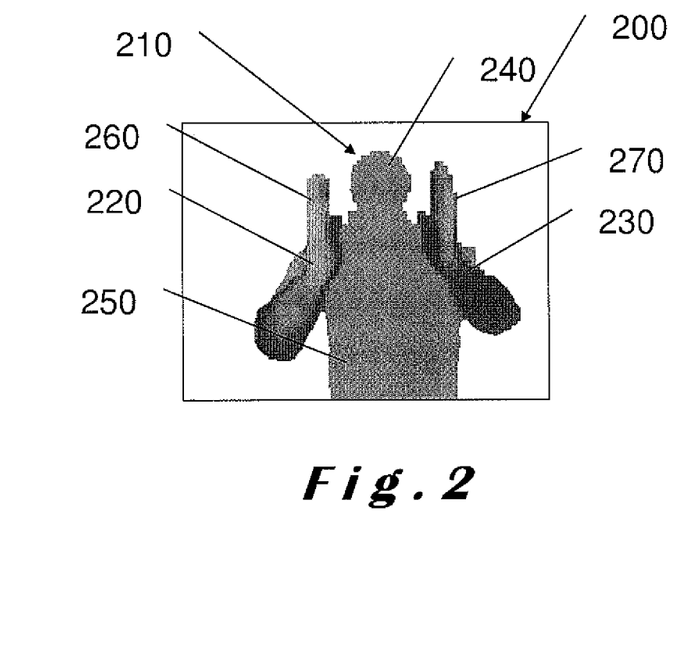
FIG. 2 illustrates a grey scale representation of a segmentation of a human user from the background in a depth map representing a 3D scene captured by a near mode range finding camera device.
Figure 3:
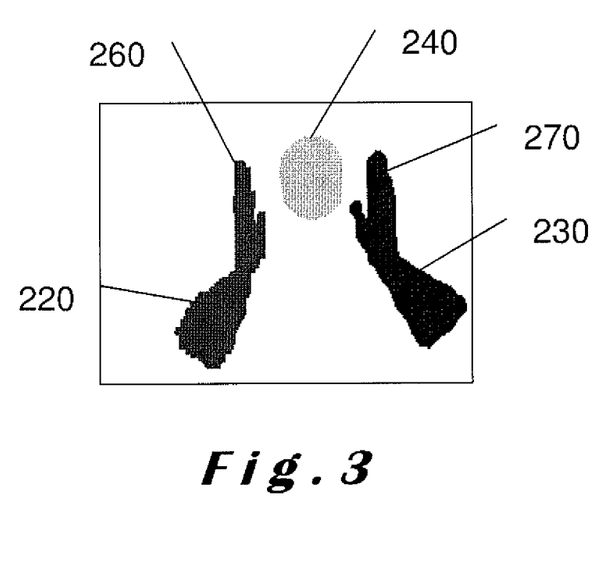
FIG. 3 illustrates a grey scale representation of limb segmentation in depth map representing a 3D scene captured by a near mode range finding camera device, in accordance with the present invention.

FIG. 2 illustrates an image 200 of a human user 210 within a 3D scene in a close interaction context. As shown, the user 210 has a pair of arms 220, 230, a head 240 and a body 250. Each arm 220, 230 has an associated hand 260, 270. Following the limb segmentation step, step 110 as described above, the arms 220, 230, together with the hands 260, 270, and head 240 of the user 200 can be isolated as shown in FIG. 3. The body 250 is not an object of interest and therefore does not form part of the output of the limb segmentation. Sorting objects of interest among the segmented objects may be done using depth measurements related to statistical moment analysis of the objects in the scene. For example, too large an object far from the camera may be removed while the same object close to the camera would be kept as a distance criteria for defining an object of interest may give priority to those objects. Typically, in a close interaction context, only one or two objects closer to the camera may be considered as being of interest.

Having performed the limb segmentation in step 110, the next step is to perform limbs tracking, step 115 (FIG. 1). In this step, 'limb' regions of a current depth image, image at t, are associated to 'limb' regions of a previous depth image, image at t−1, in a tracking process. The pair wise association is made by computing a matching score for a limb in image at t−1 and the same limb in image at t. The matching score can be a surface, or a matching surface ratio. In a preferred embodiment, the position of the pixels of each region of the previous frame can be estimated for the current frame by a state-of-the-art motion estimation algorithm. Motion can also be compensated at the region level, using a statistical value, for example, an average or a median motion.

Motion estimation refers to a process of determining motion vectors that describe a transformation from one image to another, for example, from image capture to image capture, and can be represented by a model that approximates rotation and translation in the X-, Y- and Z-axes. Motion vectors can be found using pixel-based techniques (also termed direct methods), for example, block matching, phase correlation and/or frequency domain methods, and pixel recursive algorithms. In the pixel-based methods, the evaluation metrics may be one or more of: minimum squared error (MSE), sum of absolute differences (SAD), mean absolute difference (MAD) and sum of squared errors (SSE). It is also possible to use indirect methods where features are matched using a statistical function, for example, random sample consensus (RANSAC), applied over a local or global area.

A subset of all possible associations is then computed which verifies the constraints that the retained set of associations can only model 'split' (1−n) or 'merge' (m−1) relationships. This has been described in "Comparison of image segmentations using a hierarchical model for n-m regions matchings" by L. Guigues in Proc. Of $2^{nd}$ IAPR-TC15 Workshop on Graph-Based Representations, Haindorf, Austria 1999, as a graph optimisation problem. A weighted bipartite graph is defined in which each region of the previous image and the current image corresponds to a node in the graph and an edge is set between each pair of nodes belonging to different frames, that is, a previous frame and a current frame. The edges are weighted by the matching score. An optimal matching is obtained by finding the maximum weight sub graph of this association graph which has a diameter at most 2. A two step optimal procedure was proposed. In a preferred embodiment, a greedy optimisation algorithm can be used. A greedy algorithm is an algorithm that follows the problem solving heuristic of making the locally optimal choice at each stage with the hope of finding a global optimum. In some cases, a greedy strategy need not produce an optimal solution, but nonetheless a greedy heuristic may yield locally optimal solutions that approximate to a global optimal solution.

By using a greedy optimisation algorithm, one can start with an empty solution, the relations can be sorted in decreasing score order and the sorted relations can be scanned to include in the current solution the ones which do not lead to a new solution violating the maximum graph diameter constraint. Bodies can be tracked by the same method and then only associations between limbs connected to tracked bodies can be considered for further processing.

In step 120 (FIG. 1), the extremities of the limbs are detected and tracked, that is, the hands in this case. In this step, a particular part of each limb is identified as a preferred extremity of the limb. In a preferred embodiment, for each limb segmented in step 110 (FIG. 1), a preferred extremity is determined using a weighted average of the 3D points of the limb. The weight associated with each 3D point of the limb may depend on the distance of the extremity to the mass centre of the limb as extremities are determined to be located at a position remote from the mass centre of the limb. This distance can be a Euclidian distance in 3D space or a geodesic distance on the limb surface.

Alternatively, the weight associated with each 3D point of the limb may depend on the distance to particular points in space which model preferences for extremities in specific directions in space, and that can be called 'anchor points'. Anchor points can be chosen to be located at some absolute or reference positions, such as, the camera position, or at some position relative to the limb mass centre. For example, if one uses an anchor at the camera position, then the preferred extremity selected by the method will be the closest to the camera. If one uses an anchor above and in front of the mass centre, then the preferred extremity selected by the method will by the upper-front extremity relatively to limb centre. Anchor points can be related to the relative position of the extremity in the previous frame. The method then acts as a tracking method as the extremity determined in a frame depends on the position of the extremity in a previous frame. This prevents, for example, the extremity of a limb drifting from the hand to the elbow of the user when the elbow appears to be closer to the camera or imaging device than the hand. As the tracking method is based on a weighted average, the position of an extremity is continuous with respect to the position of the 3D points corresponding to the limb being tracked. The output from the tracking process is therefore stable with respect to noise in the input data, that is, the input depth image, and is resistant to small perturbations.

Having detected the extremities, they are tracked based on the temporal associations assessed for limbs in the limb tracking step (step 125). Motion estimation may additionally be used to improve robustness of the tracking of the extremities of the limbs. Each new extremity found for each limb is associated with one of: zero or none, one or multiple previous extremities through the limb associations. The same extremity identified in a previous frame can be associated with one of: zero or none, one or multiple new extremities. The temporal tracking of the limbs only retains 1−m (split) or n−1 (merge) associations and discards n−m associations.

Figure 4:
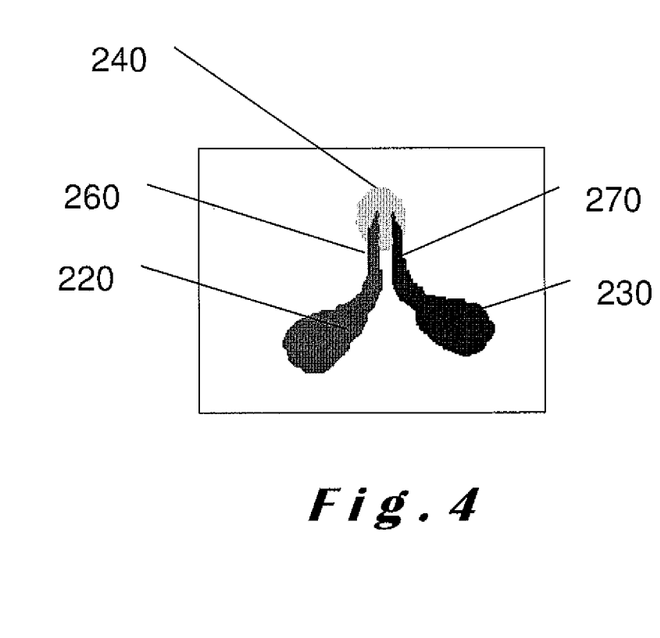
FIGS. 4 and 5 illustrate respectively tracking steps of the segmented limbs as the limbs merge in accordance with the present invention.
Figure 5:
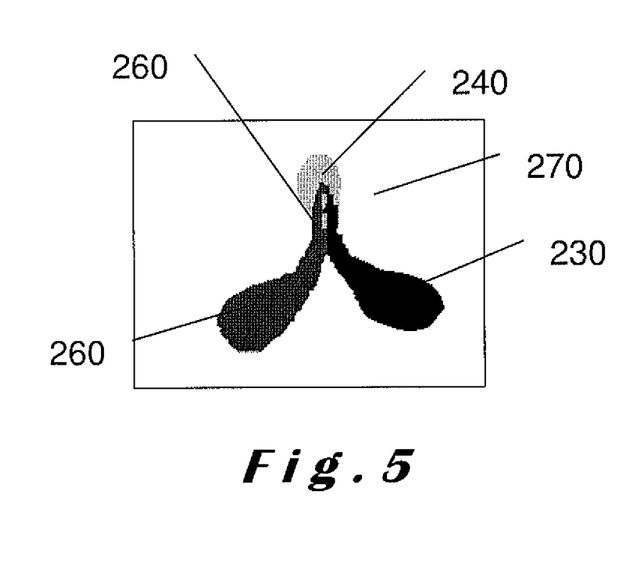

The only ambiguous cases are the 'split' and 'merge' cases where one particular association needs to be selected from a multitude of possibilities in order to track extremities which have unique paths in time. This is shown in FIGS. 4 and 5. Here, two arms 220, 230 of a user are shown in front of the head 240. FIG. 4 shows the arms 220, 230 separated from one another in the vicinity of the hands 260, 270 and FIG. 5 shows the situation where hand 260 of arm 220 is merged with hand 270 of arm 230. It will be appreciated that, although not shown, the split case starts as shown in FIG. 5 and the hand 260 of arm 220 is split from hand 270 of arm 230.

For the 'split' case, the selection of the extremity from among the different possibilities in new frame (tracking an extremity detected in a previous frame) can be determined using, for example, distance, overlap in 2D or 3D, etc. For the 'merge' case, the selection of the extremity from among the different possibilities in a previous frame (tracking an extremity detected in a current frame) can be done by using, for example, distance, overlap, or a particular criterion associated with the extremities in a previous frame, such as, their 'age' parameter (time since detection) or a preference for extremities that were detected as hands in the past.

Figure 6:
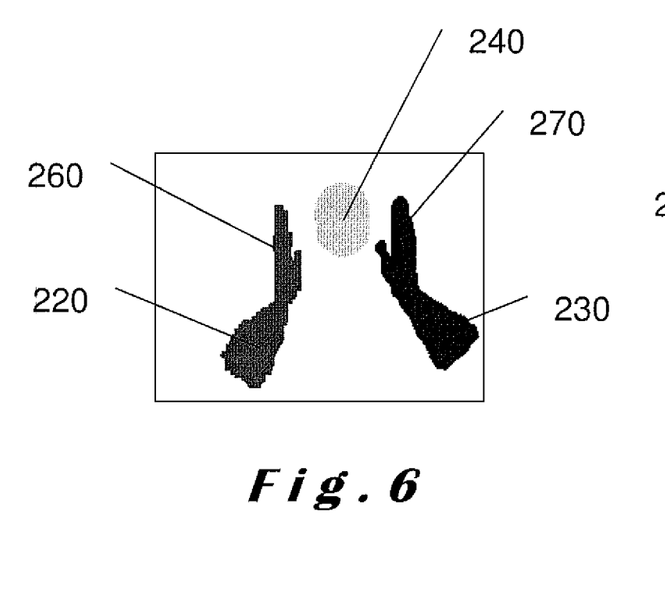
FIGS. 6 and 7 illustrate respective steps of 'cutting' limb extremities to isolate the hands in accordance with the present invention.
Figure 7:
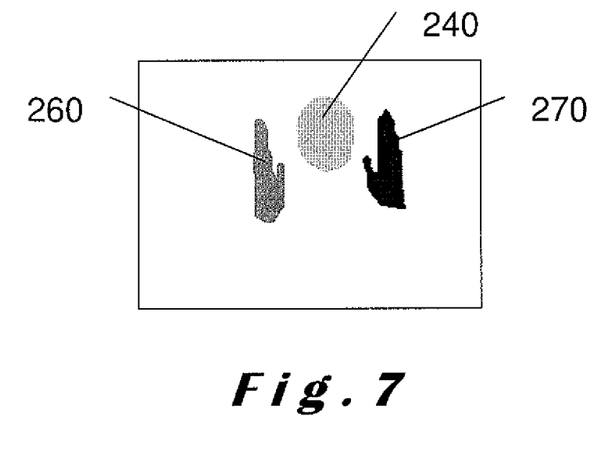

Once the positions of the extremities and the tracking of the extremities have been computed, in the extremities modelling step, step 130, the positions of the centres are refined to match a particular point of the limb which has a particular morphological or geometrical property. FIG. 6 illustrates the arms 220, 230, with their associated hands 260, 270, and head 240 to which the centres are applied, and FIG. 7 illustrates the centres 340 applied to the head 240 and centres 360, 370 applied to each hand 260, 270 on respective arms 220, 230

(FIG. 6). In a preferred embodiment, one can choose the position of the central point of the shape as the applied centre, the central point of the shape being the farthest point from the contours of the limb. This point can be efficiently determined by computing a distance of the point to the contours of the limb. In a refinement, a tracking method can be used to match, not the absolute central point of the limb, but a point which is a local maximum of the distance function which is close to the previous refined position of the extremity. Additionally, if the distance function is viewed as a density then a more robust mode estimation method can be used, such as, a mean-shift estimation. One then has a mean-shift like tracking method specifically designed to track the central point of a limb.

A subset of the points of the segmented limb are selected which may constitute points of the relevant extremity region. This selection can be done by either a 'cutting' method or a 'growing' method.

In the 'cutting' method, points are excluded from the extremity regions which are outside a particular region defined around the refined centre of the extremity. The particular region may be a sphere centred on the centre of the extremity; a half space, that is, one of two portions of 3D space separated by a plane, defined by a plane located between the extremity centre and the limb centre; or an orthogonal to the vector joining the points corresponding to the centres of the extremity, that is, the centre of the hand, and the limb, that is, the forearm. The geometrical properties of the cutting region can result from a continuous learning mechanism of some properties of the extremity, such as, the maximum distance of the refined extremity centre to the contour of the limb, computed in 3D camera coordinates, which is an estimate of the radius of the palm in the case where the extremity is a human hand.

In the 'growing' method, a 'secure' set of points of the limb to be excluded from the extremity region is identified. This set of points may comprise the farthest points from the extremity centre. The identified set of points form 'seed' points which are then grown until the growing points enter a 'sure' inclusion zone, which can be defined in a similar way as that for the 'cutting' method described above.

Figure 8:
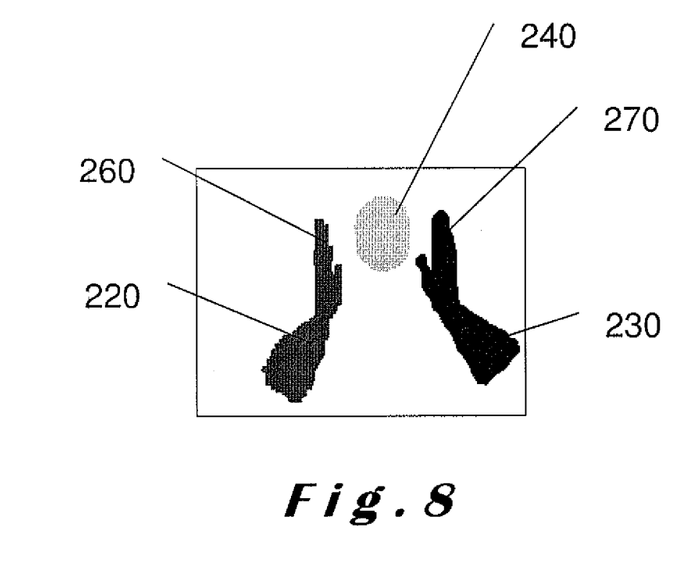
FIGS. 8 and 9 illustrate respective steps in determining centres of the isolated hands.
Figure 9:
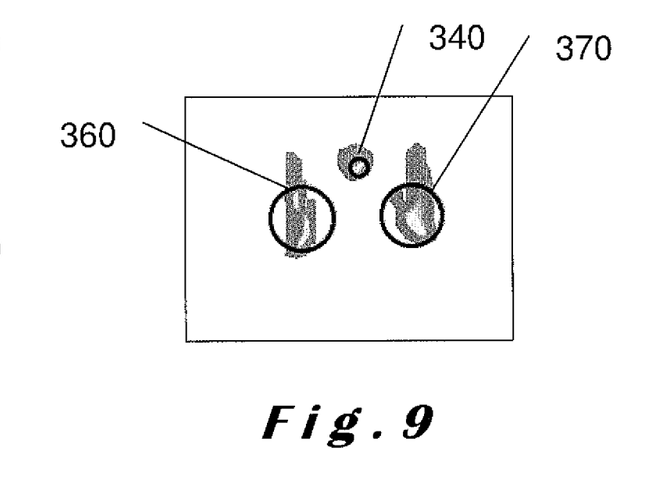

FIG. 8 illustrates the segmented arms 220, 230, together with the hands 260, 270, and head 240 without the centres applied and FIG. 9 illustrates the effect of the isolation of hands 260, 270 from the arms 220, 230 (FIG. 8).

In step 135, a hands recognition process is performed. A state-of-the art method may be used to identify known features of the hand, for example, in "Hand recognition using geometric classifiers" by Y. Bulalov, S. Jambawalikar, P. Kumar & S. Sethia, published on the internet at:
http://www.ams.sunysb.edu/~saurabh/research/hand workshop.pdf
and in "Hands gesture recognition" by A. Kirillov, May 2008 and available at:
http://www.codeproject.com/Articles/26280/Hands-Gesture-Recognition.
The output from this step can be fed back to the limb tracking step, step 115, and used as a verification for any assumptions made in that step.

In step 140, the modelling of the hands is performed. This comprises at least the determination of the hand orientation and the determination of hand tip position. For the hand orientation, principal component analysis (PCA) is performed on 3D points corresponding to the hand as determined in step 135 above. This effectively solves an eigen system of a covariance matrix. In order to perform temporal filtering on the determined principal axis of the hand, first order autoregressive temporal smoothing of the covariance matrix can be performed before solving the eigen system, in accordance with:

$$Cov(t)=RawCov(t)*\alpha+Cov(t-1)*(1-\alpha)$$

where cov(t−1) and cov(t) are the smooth covariance matrix respectively at time t−1 and t; RawCov(t) is the raw covariance matrix computed at time t; and alpha is a parameter which tunes the level of smoothing.

The first determined eigen vector provides an estimate of the principal direction or principal axis of the hand, and the third determined eigen vector provides an estimate of the palm normal. The second determined eigen vector is orthogonal to both the first and third determined eigen vectors. These eigen vectors are illustrated in FIG. 10.

Figure 10:
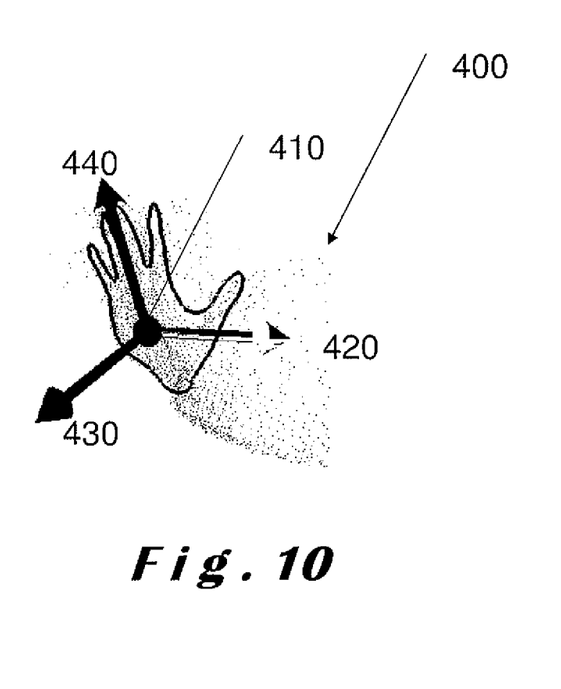
FIGS. 10 and 11 illustrate respective steps in hand modelling in a 3D point cloud representation of the range finding measurements, in accordance with the present invention.

In FIG. 10, a hand 400 is shown with a centre point 410 located in the centre of the palm. Three axes 420, 430, 440 are centred at that centre point 410 with axis 430 being the normal to the palm, axis 440 indicating the principal direction of the hand 400, and axis 420 being orthogonal to axes 430 and 440. These axes correspond to the eigen vectors described above.

Figure 11:
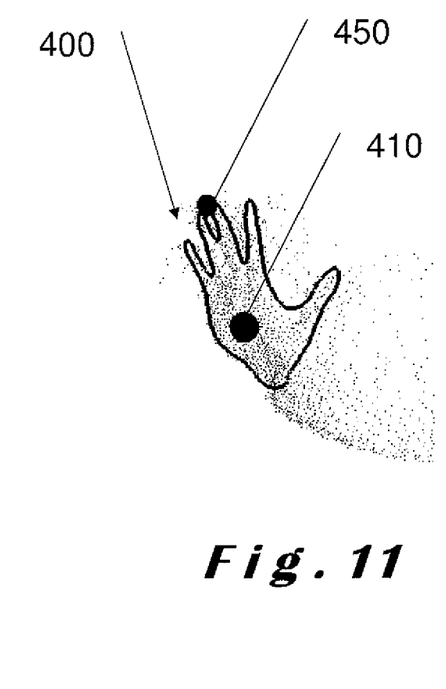

Having determined the hand orientation, a maximum hand tip position 450 is determined, that is, the position that is the furthest from the centre point 410, as shown in FIG. 11. A histogram of 3D points of the hand in a hand principal direction is determined and the farthest points are averaged. Typically, these farthest points may be determined as being, for example, in the range of 95% to 99% of histogram. The hand tip position 350 is then stabilised with respect to time. As alternatives, the previous maximum hand tip position can be used on its own or as a blend with hand principal direction, as indicated by axis 440 (FIG. 10), instead of hand principal direction only.

The precise determination of the tip of the hand can then be used to correct the estimate of the palm normal direction provided by PCA analysis in step 135 above, and, in particular, to give a better determination in case the third eigen vector is ill-defined. This corresponds to the case in which the hand is not sufficiently flat to get a well defined orientation using a planar model, for example, when the hand is in the form of a fist or where the fingers are pinched. The flatness information is provided by the eigen values of the system. More precisely, the flatness information is indicated by the ratio of the second eigen value to the third eigen value. Further information is provided by the extension of the hand which can be measured by the distance from the tip of the hand to the centre of the palm, normalised by the palm radius. The estimate of the palm normal direction is then refined by blending it with the direction of the tip of the hand with a weight which depends on the flatness and the extension of the hand.

Figure 12:
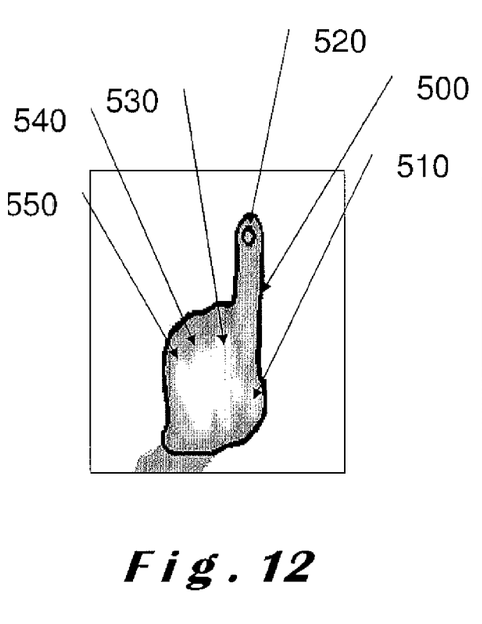
FIGS. 12 to 14 illustrate respective steps in finger detection and tracking in accordance with the present invention.
Figure 13:
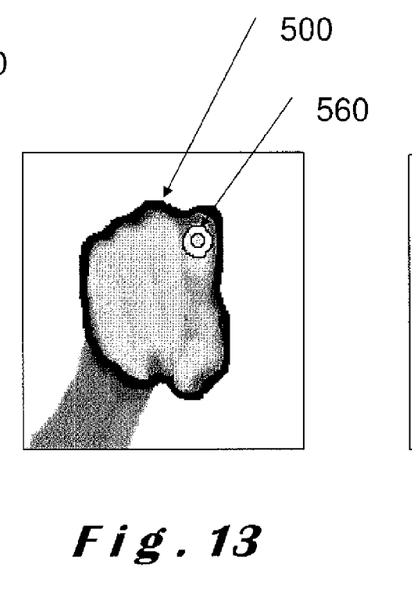
Figure 14:
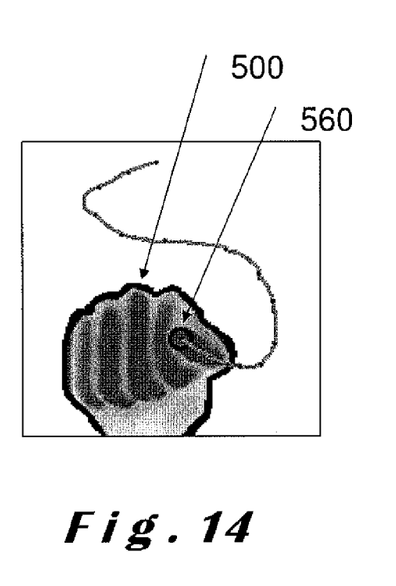

In step 145, fingers of the hand are then individually detected and tracked. The term "fingers" as used here also includes the thumb. First, the 'silhouette' fingers 510, 520, 530, 540, 550 in the hand 500 are detected as shown in FIG. 12. The 'silhouette' fingers are those that are visible in the hand contour as shown. 'Pointing' fingers are detected, that is, those fingers pointing towards the imaging device or camera as shown by finger 560 in FIG. 13. The detected 'silhouette' fingers and 'pointing' fingers are merged into a unique set of fingers avoiding duplicating fingers that are detected in both the silhouette and pointing configurations. This merger is achieved by checking whether each 'pointing' finger corresponds to the same finger as a 'silhouette' finger. If this is the case, that finger is discarded. The check can rely on the distance between the two detected fingers, the most reliable criterion using a geodesic distance. The unique set of fingers can then be tracked as shown in FIG. 14.

The detection of 'silhouette' fingers 510, 520, 530, 540, 550 can be achieved by using extremities of a morphological skeleton, or by determining a minimum of the curvature of the hand contour. One method for the detection of 'silhouette' fingers is described in "An Analysis of Features for Hand-Gesture Classification" by Thiago R. Trigo and Sergio Roberto M. Pellegrino, IWSSIP 2010, 17th International Conference on Systems, Signals and Image Processing. Here, shape descriptors such as aspect ratio, circularity, and spreadness are used together with other features, such as roundness, solidity, number of fingers, and relation "distance-radius".

The detection of pointing fingers 560 can be achieved by identifying local minima in a smooth depth image. In order to retain only the minima which correspond to the local shape of a fingertip, a number of one-dimensional profiles of the local minima are examined in a predefined number of directions. Various criteria are checked against each of these one-dimensional profiles. For the tracking portion of step 145, mappings between fingers 510, 520, 530, 540, 550 of a previous frame and those in a current frame are performed including a no match possibility. For each possible mapping, an optimal rigid transform is computed between fingers in the previous frame and associated ones in the current frame. The optimal rigid transform, that is, a 3D translation and rotation, is computed using a least squares determination. A better determination of the transform can be obtained by including the mapping between finger base positions and palm position. For each possible finger association, an error value is computed which comprises the weighted sum of the distances from fingers in the current frame to the rigidly transformed fingers in the previous frame (measuring the hand deformation); the norm of translation and rotation of the rigid transform (measuring the hand global movement); and the number of unmatched fingers (fixed cost for appearing or disappearing fingers). The association which leads to the least error is retained.

For the additional hand openness parameter computation, step 150, a continuous "openness" variable is computed using a combination of different measurements. These measurements may be the maximum distance between fingers; the maximum distance between fingers and palm or between the tip of the hand and the palm. The combination can be a linear combination or a maximum value. This continuous "openness" variable is then binarised into a Boolean state, that is, hand open or hand closed, by first performing a temporal filtering to remove noise and then normalising by the largest value that has been observed since the hand was detected. A hysteresis threshold may then be applied to obtain the desired binary state.

Having completed the steps described with reference to FIG. 1, the output data and parameters can then be used in computerised systems utilising finger tracking applications to perform human to machine interactions and, in particular, to perform hand and finger based close interactions using range finding imaging devices and the means for processing it.

The invention claimed is:

1. A method of detecting and tracking at least one feature associated with an extremity of a user in a three-dimensional scene using depth images of the scene, the method comprising the steps of:
   a) segmenting at least one region of interest within each depth image;
   b) determining at least one object of interest that corresponds to a limb of the user within the segmented depth image;
   c) tracking each limb with respect to time;
   d) identifying an extremity associated with each limb;
   e) tracking each identified extremity with respect to time; isolating each identified extremity from its associated limb;
   g) determining parameters relating to each isolated extremity;
   h) identifying at least one feature in each isolated extremity; and
   i) tracking each identified feature with respect to time.

2. A method according to claim 1, wherein step a) comprises utilising at least one structuring element adapted to be a function of the depth of each pixel in the depth image.

3. A method according to claim 1, wherein step c) comprises determining temporal associations for each limb.

4. A method according to claim 3, wherein step e) comprises tracking each extremity based on temporal associations assessed for each limb.

5. A method according to claim 1, wherein step d) further comprises using a weighted average of points of each limb in the depth image to identify each extremity.

6. A method according to claim 1, wherein step f) comprises the steps of:
   f1) determining a centre of each extremity associated with each limb of the user; and
   f2) determining a distance from the centre of the extremity to its boundary.

7. A method according to claim 6, wherein step f) further comprises using a cutting process to isolate the extremity from the limb, the cutting process being centred on the determined centre of the extremity.

8. A method according to claim 6, wherein step f) further comprises using a growing process to isolate the extremity from the limb.

9. A method according to claim 6, wherein step g) comprises the step of determining at least one parameter associated with the extremity.

10. A method according to claim 9, wherein step g) further comprises the step of using each determined parameter associated with the extremity to identify at least one feature associated with the extremity.

11. A method according to claim 9, wherein the at least one parameter associated with the extremity comprises the orientation of the extremity within the depth image.

12. A method according to claim 9, wherein step g) further comprises using each determined parameter to determine a tip position of the extremity.

13. A method according to claim 9, wherein the limb comprises an arm and the extremity comprises a hand, and wherein each feature associated with the extremity comprises at least one finger of the hand.

14. A method according to claim 13, wherein step h) comprises identifying silhouette fingers and pointing fingers within a hand contour.

15. A method according to claim 14, wherein step h) comprises merging the identified silhouette fingers and pointing fingers to form a unique set of fingers.

16. A gesture recognition method for recognising gestures made by at least one hand, comprising the method of detecting and tracking at least one feature associated with an extremity of a user in a three-dimensional scene using depth images of the scene according to claim 13.

17. A non-transitory computer readable medium storing a program causing a computer to execute a method for performing the steps of the method of detecting and tracking at least one feature associated with an extremity of a user in a three-dimensional scene using depth images of the scene, the method comprising the steps of:

a) segmenting at least one region of interest within each depth image;
b) determining at least one object of interest that corresponds to a limb of the user within the segmented depth image;
c) tracking each limb with respect to time;
d) identifying an extremity associated with each limb;
e) tracking each identified extremity with respect to time;
f) isolating each identified extremity from its associated limb;
g) determining parameters relating to each isolated extremity;
h) identifying at least one feature in each isolated extremity; and
i) tracking each identified feature with respect to time.

18. A gesture recognition system for detecting and tracking at least one feature associated with an extremity of a user in a three-dimensional scene using depth images of the scene, the gesture recognition system including a computerised system capable of performing the following steps:

a) segmenting at least one region of interest within each depth image;
b) determining at least one object of interest that corresponds to a limb of the user within the segmented depth image;
c) tracking each limb with respect to time;
d) identifying an extremity associated with each limb;
e) tracking each identified extremity with respect to time;
f) isolating each identified extremity from its associated limb;
g) determining parameters relating to each isolated extremity;
h) identifying at least one feature in each isolated extremity; and
i) tracking each identified feature with respect to time.

* * * * *